United States Patent [19]

Davis

[11] Patent Number: 5,785,766
[45] Date of Patent: Jul. 28, 1998

[54] PROCESS FOR THE COLOR RECOVERY OF VINYL PLASTICS

[76] Inventor: Ronald O. Davis, 308 Firebridge Rd., Columbia, S.C. 29223

[21] Appl. No.: 753,947

[22] Filed: Dec. 3, 1996

Related U.S. Application Data

[60] Provisional application No. 60/012,623, Mar. 1, 1996.

[51] Int. Cl.$^6$ ........................................ B08B 3/00
[52] U.S. Cl. ........................... 134/29; 134/26; 427/64; 427/140; 427/151; 427/158; 427/322; 427/379
[58] Field of Search ................ 427/64, 140, 157, 427/158, 322, 379; 134/29, 26

[56] References Cited

U.S. PATENT DOCUMENTS

| | | | |
|---|---|---|---|
| 3,660,125 | 5/1972 | Buell | 106/176 |
| 3,791,845 | 2/1974 | Tuite | 117/33.5 T |
| 3,922,232 | 11/1975 | Schein | 252/301.2 R |
| 4,460,374 | 7/1984 | Abel et al. | 8/501 |
| 4,741,860 | 5/1988 | Hartman | 252/301.21 |
| 4,945,121 | 7/1990 | Micale et al. | 523/339 |
| 5,064,570 | 11/1991 | Rohringer | 252/301.21 |
| 5,094,777 | 3/1992 | DiPietro | 252/301.35 |
| 5,401,438 | 3/1995 | Otsuka | 252/301.31 |
| 5,646,207 | 7/1997 | Schell | 524/47 |

FOREIGN PATENT DOCUMENTS

| | | |
|---|---|---|
| 232324 | 3/1959 | Australia. |
| 601271 | 7/1960 | Canada. |
| 265041(A2) | 4/1988 | European Pat. Off.. |
| 1282592 | 11/1968 | Germany. |
| 44-18958 | 8/1969 | Japan. |

*Primary Examiner*—Jill Warden
*Assistant Examiner*—Sharidan Carrillo
*Attorney, Agent, or Firm*—Richard C. Litman

[57] ABSTRACT

A process for the color recovery of vinyl plastics in which fluorescent optical whiteners are used to recover color from a vinyl plastic surface. A mild detergent and solvent is used to clean the surface and remove any accumulated films on the surface, after which the surface is dried. Coat(s) of a fluorescent solution is(are) then applied to the surface. The appearance of weathered and/or discolored vinyl plastics is restored with fluorescence in the blue to violet region of visible light without loss of reflectance when a UV absorbing fluorescent agent is used.

4 Claims, No Drawings

PROCESS FOR THE COLOR RECOVERY OF VINYL PLASTICS

CROSS REFERENCE TO RELATED APPLICATION

This application claims the benefit of U.S. provisional patent application Ser. No. 60/012,623, filed Mar. 1, 1996.

BACKGROUND OF THE INVENTION

1. Field of the Invention

The present invention is a process for counteracting the yellowing or discoloration of plastics.

2. Description of Prior Art

Vinyl plastics have achieved wide commercial acceptance for numerous utilities because they are strong, light weight, easy to manufacture, and relatively inexpensive. Despite this commercial success, vinyl plastics still have numerous characteristic flaws. One of these is its susceptibility to discoloration or yellowing due to time or weathering. Significant effort has been expended in the art to counteract this disadvantage; yet only limited success has been achieved.

Fluorescent optical whiteners, per se, are known in the art. U.S. Pat. No. 4,460,374, issued Jul. 17, 1984 to Heinz Abel et al. describes compositions for treating textiles which includes an organic solvent, a solid or liquid vehicle dissolved in the solvent, and an insoluble or sparingly soluble finishing agent. The finishing agent may include fluorescent whitening agents. Canadian Patent No. 601,271, issued Jul. 5, 1960 to Earl C. Gifford et al. describes soluble compositions of coumarin brighteners.

Combinations of optical brighteners or fluorescent whiteners with bleaches have also been proposed. For example, Australian Patent Specification Serial No. 232,324, published Mar. 5, 1959 and assigned to Geoffrey Sly describes solid compositions for treating cellulosic fibrous materials that include a solid chemical bleach and a benzothiophene dioxide optical brightener. European Patent Application Publication No. 265,041 (A2), published Apr. 27, 1988 and assigned to The Clorox Company describes a thickening system for laundry products that includes a fluorescent whitening agent or dye, a surfactant, and an acidic pH adjusting agent, suitable for formulation with peroxide bleaches.

Optical or fluorescent brighteners have been used in coating compositions. U.S. Pat. No. 4,741,860, issued May 3, 1988 to Marvis E. Hartman describes detectable adhesion promoting compositions that include a chlorinated polyolefin and an optical brightener. U.S. Pat. No. 5,064,570, issued Nov. 12, 1991 to Peter Rohringer describes a dispersions of fluorescent brighteners and water-insoluble fatty alcohol auxiliaries in coating compositions. U.S. Pat. No. 5,401,438, issued Mar. 28, 1995 to Masahiro Otsuka describes an indole compound which is useful as a UV light absorbing additive or an anti-halation additive for colored resin compositions, resin films, heat-sensitive recording materials, liquid crystal display materials and the like.

Bleaching of polymeric substrates with optical brighteners has been explored in the prior art. German Patent No. 1,282,592, published Nov. 15, 1968 and assigned to Farbwerke Hoechst Aktiengesellschaft describes optical brighteners for polyamides, polyesters, vinyl chloride polymers, and the like, that include a yellow benzoxazole compound with reddish to greenish blue fluorescence. Japanese Patent 44-18958, published Aug. 18, 1969 and assigned to Mitsubishi Chem. Inds. Ltd. describes optically bleaching polyamide type moldings with acylaminocumarine fluorescent agents.

None of the above inventions and patents, taken either singularly or in combination, is seen to describe the instant invention as claimed. Thus a process for the color recovery of vinyl plastics solving the aforementioned problems is desired.

SUMMARY OF THE INVENTION

The present invention is directed to the use of fluorescent optical whiteners in a post manufacturing process to recover color from a vinyl plastic surface. The process involves using a mild detergent and solvent to clean the surface and remove any accumulated films, drying the surface as necessary, and applying at least one coat of a fluorescent solution to the surface.

Accordingly, it is a principal object of the invention to provide a method for restoring the appearance of weathered and/or discolored vinyl plastics.

It is another object of the invention to provide a method in which yellowing is counteracted by blue light without loss of reflectance.

It is an object of the invention to provide improved elements and arrangements thereof in a process for the color recovery of vinyl plastics for the purposes described which is inexpensive, dependable and fully effective in accomplishing its intended purposes.

These and other objects of the present invention will become readily apparent upon further review of the following specification.

DETAILED DESCRIPTION OF THE PREFERRED EMBODIMENT

The present invention is a process which preferably includes the steps of:

a) cleaning the surface using a mild detergent;

b) drying the surface following a);

c) applying a mild solvent to remove any accumulated films on the surface;

d) drying the surface following c); and e) applying at least one coat of a fluorescent solution to the surface.

The mild detergent used in step a) is not in itself novel, and may advantageously include any commercially available detersive surfactants. Accordingly non-ionic, anionic, and/or cationic detersive agents may be formulated for use with the present process, or acquired in commercially available compositions such as those commonly used as dishwashing detergents. Cleaning should continue until all foreign particulate and fluid materials are removed.

The mild solvent used in step c) preferably includes alcohols, ethers, petroleum products and/or organic solvents of sufficient strength to remove accretionary soil films without damaging the vinyl surface. Accordingly, methanol, ethanol, propanol, butanol and/or a mixture of organic solvents may be used. Most preferably, these solvents are used in high dilution. Soil films, including those of solidified organic oils, may be removed in a plurality of applications of the solvent. When the surface has acquired a similar appearance to the original surface, excepting any yellowing that has occurred, the surface is again dried.

Drying steps b) and d) may be accomplished by ambient exposure for sufficient time to substantially remove all fluids from the vinyl surface. These steps may also be accelerated by any application of heat and/or air as desired.

Step e) uses a fluorescent solution to counteract any yellowing of the vinyl plastic surface. The fluorescent solution used includes a fluorescent agent which has at least a portion of its emissions in the violet/blue region of the visible spectrum. Accordingly, fluorescent agents which emit at wavelengths of from about $3.9 \times 10^{-7}$ m to about $4.92 \times 10^{-7}$ m may be used. Most preferably, the fluorescent agent is chosen to have absorption wavelengths in the UV region, thereby converting invisible radiant energy to visible violet and/or blue, without any appreciable decrease in luminous reflectance. Because the violet/blue region of visible color space is opposite the yellow region, yellowing is effectively counteracted. The fluorescent agents themselves are commercially available. The selection of an appropriate fluorescent agent from those available to meet the above criterion of emissions and optionally absorptions may be done using available spectral data of the agents. Appropriate fluorescent agents include UVITEX OB (thiophenediyl bis(tert-butylbenzoxazole)), stilbene, and stilbene derivatives. Most preferably, the fluorescent agent is a 0.01 percent by weight solution of UVITEX OB.

It is to be understood that the present invention is not limited to the embodiment described above, but encompasses any and all embodiments within the scope of the following claims.

I claim:

1. A process for restoring color to a deteriorated vinyl plastic surface, the process comprising the steps of:

(a) applying a detergent to the deteriorated vinyl plastic surface to clean foreign particulate and fluid materials from the surface;

(b) drying the surface following step (a);

(c) applying a solvent to the deteriorated vinyl plastic surface to remove any accumulated films on the surface, said solvent selected from a group consisting of methanol, ethanol, propanol and butanol, (d) drying the surface following step (c); and (e) applying a fluorescent solution to the vinyl plastic surface to restore color to the vinyl plastic surface, wherein said fluorescent solution comprises at least one florescent agent having emissive wavelengths in the blue to violet region of visible light.

2. The process according to claim 1, wherein said detergent comprises at least one surfactant selected from the group consisting of non-ionic, anionic, and cationic detersive agents.

3. The process according to claim 1, wherein said fluorescent agent has absorption wavelengths in the ultraviolet region.

4. The process according to claim 3, wherein said fluorescent agent is selected from the group consisting of stilbenes and thiophenediyl bis(tert-butylbenzoxazole).

* * * * *